United States Patent Office 3,486,888
Patented Dec. 30, 1969

3,486,888
PHOTOELECTROSTATIC RECORDING MEMBER
Luther C. Browning, Palatine, Ill., assignor to Addressograph-Multigraph Corporation, Mount Prospect, Ill., a corporation of Delaware
No Drawing. Filed June 17, 1966, Ser. No. 558,285
Int. Cl. G03g 5/08
U.S. Cl. 96—1.7
8 Claims

ABSTRACT OF THE DISCLOSURE

A photoelectrostatic recording member with increased sensitivity comprising a support and a layer of material thereon of zinc oxide treated with a tetrahalophenolphthalein or one of its salts.

---

This invention relates to photocopying and, more particularly, to new dye sensitizers for a zinc oxide photoelectrostatic recording member that shift the photosensitivity of the member towards the visible region of the spectrum.

It is well known that photoconductive zinc oxide dispersed in a resin binder coated on a suitable conductive support, e.g., paper, serves as a copy sheet that can be imaged in accordance with the photoelectrostatic process. Such a recording member is charged in the dark and then exposed to a light pattern which discharges the member in light-struck areas leaving behind a latent electrostatic image. The latent image is converted to a visible form by developing with a pigmented granular material which is attracted to the image areas. The developer material can be permanently fixed to the surface of the recording member by any conventional technique such as heat or exposure to a solvent vapor.

Photoconductive zinc oxide, in the charged state, is only rapidly discharged upon exposure to ultraviolet radiation. When an ordinary, inexpensive tungsten lamp, which is known to have an extremely low ultraviolet output, is used as the source of illumination, the rate of charge dissipation of untreated zinc oxide is extremely slow. This disadvantage is largely overcome by treating the zinc oxide with organic dyes that extend the light-sensitivity of the zinc oxide into the visible region of the spectrum thereby making better use of tungsten light sources.

While various dyestuffs have been suggested as agents for increasing the sensitivity of zinc oxide to visible light, many of these known dyes are unsatisfactory since they must be used in large amounts thereby coloring the surface of the recording member to reduce the contrast between the image and background areas. Such coloration also has an undesirable esthetic effect. However, it is appreciated that under some circumstances, for example, where the powder image is transferred to another sheet, the color of the zinc oxide is of no concern. In any event, from an economic standpoint, it is highly desirable to have a large group of low-cost dyestuffs from which to select a sensitizer.

Accordingly, it is the general object of this invention to provide a zinc oxide photoelectrostatic recording member that has a spectral response in the visible portion of the spectrum.

It is another object of this invention to provide new dyes for sensitizing zinc oxide which may be incorporated into the photoconductive layer of a copy sheet without interfering with the whiteness of the sheet.

A further object of this invention is to provide inexpensive dye sensitizers for zinc oxide.

It has been found that derivatives of phenolphthalein when adsorbed by zinc oxide particles shift the light-sensitivity of the particles well into the visible range of from 450 to 650 millimicrons. Dye sensitizers of the present invention may be represented by the following general formula:

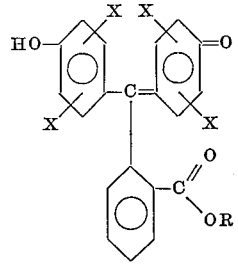

where X represents a halogen group and R represents hydrogen, an alkali metal cation, ammonium ion or an alkyl radical having from 1 to 6 carbon atoms.

The following compounds are representative of materials falling under the above general formula that give excellent results as sensitizers.

(1) Tetraiodophenolphthalein sodium salt:

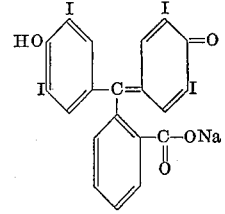

(2) Tetrabromophenolphthalein:

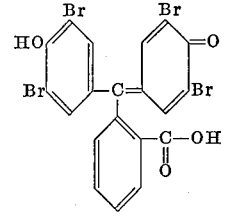

(3) Tetrabromophenolphthalein ethylester:

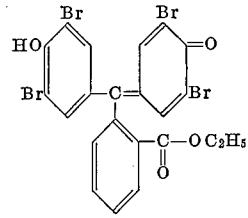

The tetraiodophenolphthalein sodium salt is preferred when the whiteness of the sheet is a prime consideration. In this instance the amount of dye necessary to produce an acceptable rate of charge dissipation upon exposure to an ordinary light source is so slight that substantially no color is imparted to the copy sheet. When speed is the major factor to be considered the tetrabromophenolphthalein is the preferred dye.

Other operable dyes of this invention are tetrabromophenolphthalein sodium, potassium or lithium salts, tetrachlorophenol, and the sodium, potassium or lithium salts of tetrachlorophenolphthalein.

In the preparation of a photoelectrostatic recording member, zinc oxide is dispersed in either a solution or an aqueous emulsion of the insulating resin binder and applied to a conductive substrate. The dyes of this invention can be added directly to the dispersion or, as an alternative, they can be mixed beforehand with the photoconductor, as for example, from an alcoholic solution. The quantity of dye employed can vary over a wide range depending upon the desired results. As can be readily appreciated, when too little dye is added no sensitization will occur while addition of dye beyond a certain point will result in no increase in sensitization. The dye concentration can range from 0.001 to 0.5% based on the weight of zinc oxide, preferably, from .009 to 0.2% based on the weight of zinc oxide.

A wide variety of suitable known binder materials may be used, such as, for example, polyvinyl acetate, copolymers of vinylchloride-vinylacetate, polystyrene, and silicone resins. The sensitized zinc oxide-resin blend can be applied to a number of conductive substrates such as paper or metal.

The invention is disclosed in further detail by means of the following examples which are provided for purposes of illustration only. It will be understood by those skilled in the art that various modifications in photoconductive materials, relative proportions of zinc oxide-resin binder and operating conditions can be made within the disclosure of this invention without departing from the spirit and scope thereof.

EXAMPLE I

Zinc oxide resin base

Typical formulations of a zinc oxide photoconductive coating are prepared by mixing the following ingredients:

| | Grams |
|---|---|
| Zinc oxide (AZO-661, American Zinc and Smelting Company) | 300 |
| Silicone resin (SR-82, General Electric Company) | 83.3 |
| Toluene | 475 |

The zinc oxide, resin and toluene are ball milled for about three hours to insure complete mixing and to obtain a smooth, uniform consistency for the subsequent coating step.

Dye system

During the milling process, an alcoholic dye solution is added to the base. The dye system is prepared by dissolving 0.30 gram of tetraiodophenolphthalein salt, which represents 0.10% dye based on the weight of zinc oxide, in 50 cc. of methanol. The dye is then added to the base during the milling operation to insure complete mixing. This blend, thoroughly mixed, is applied to a paper support member using conventional coating equipment. The solvents are evaporated from the coating by passing the member through a drying oven heated to between 230–250° F. The member, when dried, has a photoconductive layer approximately 0.5 mil thick.

As an alternative procedure, the tetraiodophenolphthalein sodium salt can be adsorbed directly by the zinc oxide particles followed by mixture with the resin. In this case, the zinc oxide and the alcoholic salt solution are mixed together and then the alcohol is evaporated, leaving the dye adsorbed on the zinc oxide surface. The sensitized zinc oxide is then dispersed in the resin binder and applied to a suitable substrate.

As one mode of testing the sensitizing effect of the dyes, the voltage decay rate is measured. According to this procedure a photoconductive member previously charged in the dark is exposed to radiation with the rate of charge dissipation being measured with a dynamic electrometer similar to the one described by E. C. Giaimo in RCA Review, vol. 22, 780 (1961). The recording member prepared in accordance with this example, sensitized with tetraiodophenolphthalein sodium salt is charged in the dark and exposed using a tungsten light source, "Co-Light," manufactured by Colwell Litho Products, Inc. The rate of voltage decay of this member is in the order of 125 volts per second as compared to the extremely slow rate of 9 volts per second for an unsensitized zinc oxide member.

EXAMPLE II

Using 0.3 gram of tetrabromophenolphthalein dissolved in 50 cc. of methanol, the same procedures were followed in mixing the ingredients and preparing a recording member as in Example I. When this recording member was charged in the dark and exposed to the tungsten light source, the rate of voltage decay was in the order of 122.5 volts per second.

EXAMPLE III

This example is similar to Example I with the exception that tetrabromophenolphthalein ethylester is substituted for tetraiodophenolphthalein sodium salt, the same amounts and the same procedures being followed for preparing the sensitized recording member as in Example I. The light decay rate of the recording member of this example upon being exposed to visible radiation was 105 volts per second.

In addition to preparing recording members and measuring voltage decay rates, the effectiveness of dye sensitizers was tested by measuring the resistance of treated and untreated zinc oxide particles in the absence and presence of light. According to this method, sensitized zinc oxide particles are deposited on a nonconductive strip removed from a 2-inch square of conductive NESA glass. The assemblage is connected across an ohmmeter and resistance measurements are made in the absence of light and compared with resistance measurements taken in the presence of light.

When zinc oxide particles having adsorbed only 0.002% of the tetraiodophenolphthalein sodium salt were exposed to radiation having a wavelength of 600 millimicrons using a Bausch and Lomb monochrometer as the light source, the resistance of the particle was $1.8 \times 10^{10}$ ohms as compared to $1.2 \times 10^{12}$ ohms for unsensitized zinc oxide. In the absence of light the treated zinc oxide particles exhibited a dark resistance of $4 \times 10^{12}$ ohms, the dark resistance of untreated zinc oxide being $2 \times 10^{12}$.

When zinc oxide was treated with 0.002% of the tetrabromophenolphthalein the dark resistance was $9.6 \times 10^{11}$ ohms with the light resistance being $1.4 \times 10^{10}$ ohms.

The sensitizing effect of the dye can be demonstrated by the increase in the dark-light resistance ratio of treated zince oxide particles. The increase in the dark-light resistance ratios is due primarily to the decreasing light resistance of the treated particle. The following table showing the ratio of light-dark resistance of treated and untreated zinc oxide using the same amounts of various materials, namely, 0.002% based on the weight of zinc oxide, serves to illustrate the marked increase in the spectral response of the zinc oxide when treated with the dyes of this invention. It will be appreciated that the ratio values given in the following table, while serving to demonstrate what dyes are useful sensitizers and establishing a relative order of effectiveness are not directly correlated in a quantitative sense to performance in a recording member owing to the resin binders and supporting conductive substrates used. However, these values can be relied upon to distinguish between sensitizing agents and materials which have no utility.

TABLE I

| Material Tested | Ratio of dark resistance to light resistance | Wave length (mμ) |
|---|---|---|
| (Untreated) | 2 | 600 |
| Phenolphthalein | 10 | 600 |
| Tetrabromophenolphthalein ethyl ester | 112 | 580 |
| Tetraiodophenolphthalein sodium salt | 200 | 600 |
| Tetrabromophenolphthalein | 800 | 580 |

Referring to the dark-light resistance ratios shown in Table I, it will be observed that the dyes of this invention greatly improve the spectral response of the zinc oxide thereby permitting use of tungsten light sources.

Surprisingly, the parent dye, phenolphthalein, being unsubstituted, has no utility as a sensitizer although a slight measurable increase is observed.

What is claimed as new and desired to be secured by Letters Patent of the United States is:

1. A photoelectrostatic recording member comprising a photoconductive layer applied to a conductive substrate, said layer comprising photoconductive zinc oxide particles dispersed in a resin binder material in which the zinc oxide particles are treated with an organic dye having the following general formula:

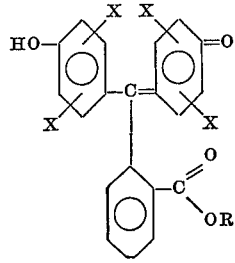

in which X is a halogen, and R is a hydrogen, an alkali metal cation, ammonium ion or an alkyl radical having from 1 to 6 carbon atoms and the ratio of the dark resistance to light resistance of said treated zinc oxide measured at a wavelength of 600 millimicrons is at least 100, said dye being present in the range of from 0.001% to 0.5% by weight of zinc oxide.

2. A photoelectrostatic recording member of claim 1 wherein the sensitizing dye is a tetrabromophenolphthalein.

3. A photoelectrostatic recording member of claim 1 wherein the sensitizing dye is tetrabromophenolphthalein ethyl ester.

4. A photoelectrostatic recording member of claim 1 wherein the sensitizing dye is tetraiodophenolphthalein sodium salt.

5. A photoelectrostatic recording member of claim 1 wherein the sensitizing dye is tetrabromophenolphthalein sodium salt.

6. A photoelectrostatic recording member of claim 1 wherein the sensitizing dye is tetrachlorophenolphthalein.

7. A photoelectrostatic recording member of claim 1 wherein the sensitizing dye is tetrachlorophenolphthalein sodium salt.

8. The method of imaging a photoelectrostatic recording member comprising a photoconductive layer having photoconductive zinc oxide particles dispersed in an insulating resin binder said layer being supported on a conductive base comprising the steps of:
   applying to the layer a uniform electrostatic charge in the absence of light,
   exposing said charged layer to a light image containing electromagnetic radiation in the range of about 450 to 600 millimicrons whereby a charge pattern is formed on said layer,
   developing said charge pattern by depositing electroscopic developer powder on said layer,
   said method being characterized wherein said zinc oxide particles are treated with an organic dye in the range of from .001% to 0.5% by weight of the weight of zinc oxide said dye having the following general formula:

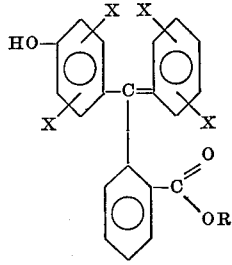

in which X is a halogen, and R is hydrogen, an alkali metal cation, ammonium ion or an alkyl radical having from 1 to 6 carbon atoms.

References Cited

UNITED STATES PATENTS

| 3,042,515 | 7/1962 | Wainer | 98—48 |
| 3,203,795 | 8/1965 | Schaum et al. | 96—1.7 |

FOREIGN PATENTS 660,965  3/1965  Belgium.

NORMAN G. TORCHIN, Primary Examiner

J. R. HIGHTOWER, Assistant Examiner

U.S. Cl. X.R.

252—501